United States Patent [19]

Rücker

[11] 4,214,440
[45] Jul. 29, 1980

[54] COMPOSITE GAS TURBINE ENGINE FOR V/STOL AIRCRAFT

[75] Inventor: Gerhard Rücker, Karlsfeld, Fed. Rep. of Germany

[73] Assignee: Moteren-Und Turbinen-Union Munchen GmbH, Munich, Fed. Rep. of Germany

[21] Appl. No.: 947,690

[22] Filed: Oct. 2, 1978

[30] Foreign Application Priority Data

Oct. 7, 1977 [DE] Fed. Rep. of Germany ....... 2745131

[51] Int. Cl.² .......................... F02K 3/04; F02C 3/06
[52] U.S. Cl. ................................ 60/226 B; 60/39.33; 60/269
[58] Field of Search ............. 60/226 B, 226 R, 39.33, 60/262, 225, 224, 39.16 S, 269; 416/55, 146 R, 171; 244/7 R

[56] References Cited

U.S. PATENT DOCUMENTS

| 2,737,018 | 3/1956 | Bain | 60/39.33 |
|---|---|---|---|
| 2,803,943 | 8/1957 | Rainbow | 60/39.33 |
| 2,981,063 | 4/1961 | Wickman | 60/39.16 S |
| 3,381,474 | 5/1968 | Gist | 60/224 |
| 3,678,690 | 7/1972 | Shohet | 60/39.33 |
| 3,792,586 | 2/1974 | Kasmarik | 60/226 R |

Primary Examiner—Douglas Hart
Attorney, Agent, or Firm—Alan H. Levine

[57] ABSTRACT

A composite gas turbine engine including a fan, a lift device, a compressor, and a turbine for operating the fan, lift device, and compressor. An inner annular duct leads air from the fan to the compressor and turbine, and an outer annular duct leads air from the fan so that it bypasses the compressor and turbine. A supercharger is located between the fan and compressor and within the inner duct. A drive shaft rotated by the turbine is alternatively coupled either to the fan or to the supercharger and lift device. The supercharger raises air pressure flowing to the compressor to a greater degree than does the fan. The drive shaft is connected to a fan shaft and a supercharger shaft through a gearset, and brakes are provided for arresting the motion of the latter two shafts. A third duct leads from the fan to the inner duct while bypassing the supercharger, and means are provided for optionally guiding air into the third duct when the fan is operating, or to the supercharger when the fan is immobilized. The flow of air to the supercharger is varied according to the speed of the supercharger. Intake of hot exhaust by the compressor and supercharger is prevented.

11 Claims, 1 Drawing Figure

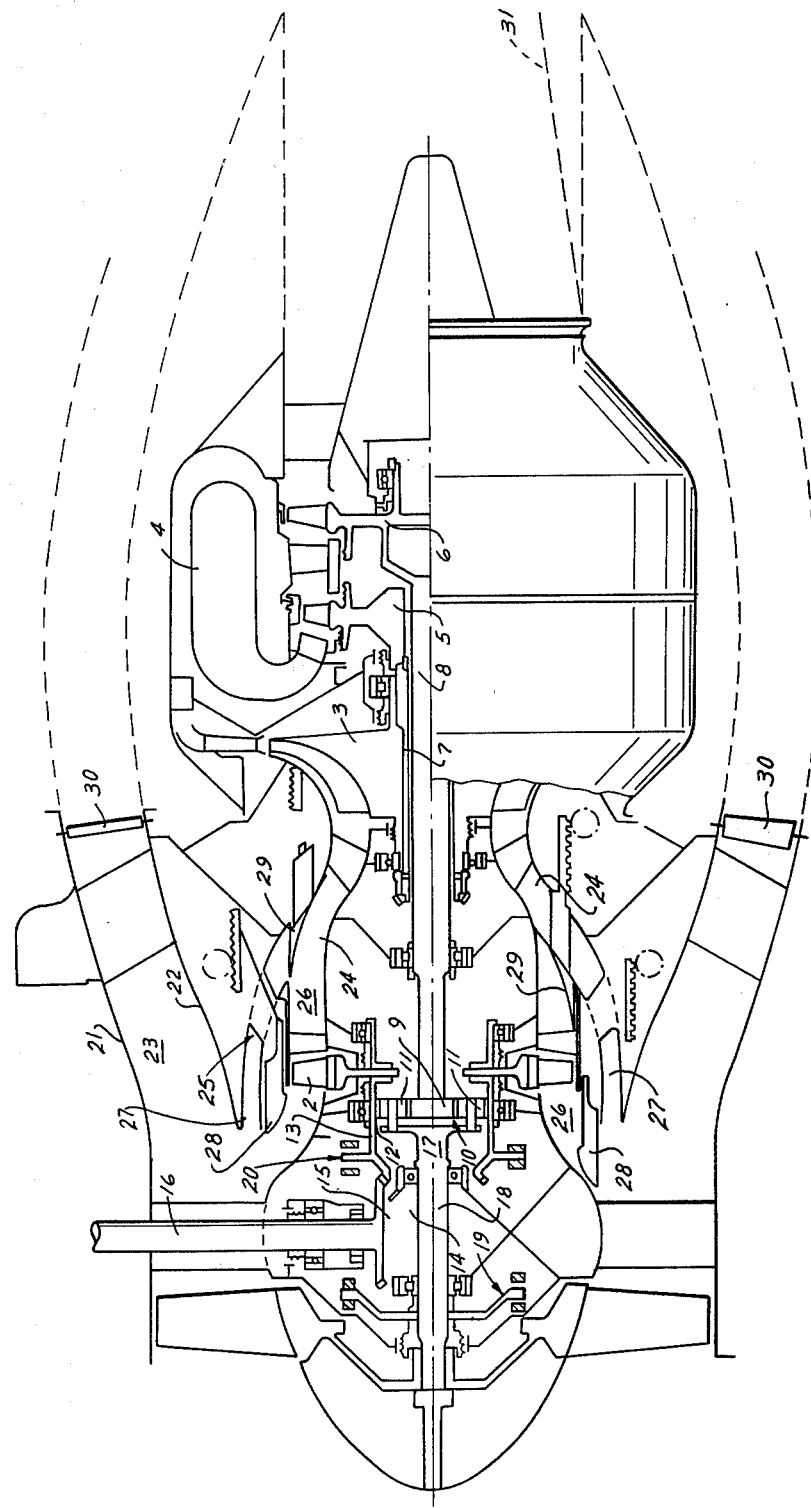

COMPOSITE GAS TURBINE ENGINE FOR V/STOL AIRCRAFT

This invention relates to a composite gas turbine engine for V/STOL aircraft having a fan, a compressor, and a multiple-stage turbine. The turbine drives the fan for propulsion, a lift device for lift, and the compressor. The engine has two annular ducts arranged one within the other, one duct guiding the air flow from the fan, and the other annular duct bypassing the compressor and the turbine.

A composite engine of this description is used, e.g., on a compound helicopter to power a lift rotor at take-off and landing and to produce propulsion at fast-cruise flight, when the rotor is immobilized and lift is generated by the fixed wings of the helicopter. An engine of this description is called a composite engine because it energizes the lift device of a V/STOL aircraft and produces propulsion for the aircraft.

Among known composite engines are ones having, apart from the gas generator turbine stages, two additional separate turbine stages, one of which powers the fan and the other the lift device. To power the fan and the lift device the turbine stages are, by means of a change-over mechanism, alternatively energized with hot gas, one stage at a time being immobilized and carried as dead weight when the other stage is being energized with hot gas. Immobilization of the fan during take-off and landing eliminates the rise in pressure of the air flow through the core engine, normally caused by the fan. With the fan immobilized, both the ultimate compressor pressure and the air flow through the engine core are inferior to the pressure and air flow achieved with the fan operating. Considering that the power requirement is extreme especially in the take-off phase and that the engine is designed around the take-off power requirement, the engine must be sized big enough for sufficient power at take-off when the fan is immobilized. In cruise flight the engine will then run far down in the part-load range, because on the one hand the pressure ratio achieved is greater and because, on the other hand, the power requirement is less. An engine of this description will be unusually large and its specific fuel consumption will be poor.

German Pat. No. 2,157,611 discloses a composite engine of the initially-described category wherein the fan is not immobilized when the lift device is being operated, so that the pressure level of the engine core is not reduced. The fan of that engine, however, not only requires variable guide vanes but also a variable outer rotor blade portion. The fan is of great design complexity if it is to be operated at the high circumferential speeds commonly associated with the fans of other composite engines.

A broad object of the present invention is to provide a composite engine of the initially-described category, wherein a reduction in the power of the engine at the time the lift device is operated is prevented, and the disadvantages of known composite engines are eliminated.

It is a particular object of the present invention to provide a composite engine wherein a supercharger is arranged between the compressor and the fan, the one annular duct passing through the supercharger, and the supercharger being coupled to at least one stage of the turbine via a drive shaft which optionally powers the supercharger and the lift device or the fan.

The composite engine of the present invention accordingly permits the fan to be immobilized without suffering power losses, since the supercharger comes into action whenever shaft horsepower is expended to energize the lift device. Like the known composite engines, the composite engine of the present invention produces propulsion by means of the fan and by the residual thrust of the engine core comprising the supercharger, the compressor, and the turbine. The supercharger of the present invention is immobilized whenever no shaft horsepower is expended to energize the lift device. The composite engine of the present invention provides an advantage over known composite engines wherein one turbine stage is immobilized whenever the other is energized with hot gas, since the dead weight carried by the engine of this invention in the propulsion mode is considerably less than with known composite engines wherein one or the other of the turbine stages is invariably immobilized.

It is a further object of the present invention to provide a composite engine wherein the supercharger is designed to raise the pressure of the air flowing to the compressor to a greater degree than the fan. In this manner, ample power is available especially for take-off.

It is another object of the present invention to provide a composite engine wherein the drive shaft is connected, through a gearset, to two output shafts, one of which is connected to the fan while the other is connected to the supercharger and to a further output shaft serving to power the lift device. In a preferred embodiment of the present invention, the gearset comprises a planet carrier, a plurality of planet pinions, a sun wheel, and a ring gear, the planet carrier forming an integral part of the one output shaft connected to the fan, the sun wheel being arranged at one end of the drive shaft, and the ring gear being attached to the other output shaft connected to the supercharger and the further output shaft.

It is an additional object of the present invention to provide two brakes, one of which cooperates with the one output shaft and the other with the other output shaft.

It is a further object of the present invention to provide a flow deflector means as well as an additional annular duct bypassing the supercharger and discharging into the one annular duct at a point downstream of the supercharger. The flow deflector means deflects the flow of air to the compressor optionally into the additional annular duct bypassing the supercharger when the fan is being operated, or when the fan is immobilized into the annular duct passing through the supercharger. Bypassing the immobilized supercharger serves to eliminate the high flow losses incurred in the vane cascade of the supercharger when the flow is allowed to pass through it.

It is another object of the present invention to provide a composite engine wherein use can optionally be made in the one annular duct, in lieu of the flow deflector means and the further annular duct, of variable vane cascades upstream and downstream of the supercharger, to adapt the incidence and the volume of the air flowing through the supercharger to the blade angle and the speed of the supercharger, thereby eliminating the need for bypassing the flow around the supercharger when it is immobilized.

If use is made of a flow deflector means and of an additional annular duct, this means can according to a further object of the present invention be variable such that the amount of air flowing in the one annular duct through the supercharger can be adapted to variations in the speed of the supercharger. In addition to the flow deflector means, use can also be made in the one annular duct at a point upstream of the supercharger of a variable-geometry inlet guide vane cascade to adapt the incidence of the air flowing in the one annular duct through the supercharger to variations in the speed of the supercharger.

It is a further advantageous object of the present invention to provide means in the other annular duct for preventing the intake of hot gas by the compressor or the supercharger.

It is a preferred feature of the present invention to provide a variable exhaust nozzle arranged downstream of the turbine.

Further objects and advantages of the present invention will become apparent from the following description read in light of the accompanying drawing. The drawing is a sectional view taken along the centerline of a composite engine according to the present invention and illustrates one embodiment of the present invention.

The composite engine of the present invention comprises, in the order of the direction of flow, a fan 1, a supercharger 2, a centrifugal-flow compressor 3, a reverse-flow annular combustion chamber 4, a gas generator turbine 5, and a power turbine 6. The gas generator turbine 5 is arranged on a tubular gas generator shaft 7 connected to the centrifugal compressor 3. When the engine is running the gas generator turbine 5 is energized with hot gas from the combustion chamber 4 to drive the centrifugal compressor 3 by means of the tubular gas generator shaft 7.

The power turbine 6 is arranged on a drive shaft 8 extending longitudinally through the tubular gas generator shaft 7 and carrying, at its end pointing away from the power turbine 6, a sun wheel 9 forming part of a planetary gearset 10. The planetary gearset 10 is arranged upstream of the supercharger 2 and includes a plurality of planet pinions 11 arranged at the circumference of the sun wheel 9 and meshing with a ring gear 12 attached to an output shaft 13.

Downstream of the ring gear 12, the output shaft 13 carries the supercharger 2, and upstream of the ring gear 12 it carries a bevel gear 14 meshing with another bevel gear 15. The bevel gear 15 is attached to the end of an output shaft 16 extending at right angles to the output shaft 13, the shaft 16 being connected to a lift rotor omitted in the drawing. The planet pinions 11 are arranged on a planet carrier 17 attached to one end of an output shaft 18, the latter carrying the fan 1 at its other end. Attached to an engine portion stationary relative to the output shafts 13 and 18 are two brakes 19 and 20. The brake 19 cooperates with the output shaft 18, and the brake 20 cooperates with the output shaft 13.

The engine of the present invention has an outer shell 21 enveloping the fan 1 and the engine core. An inner shell 22, enveloping the engine core, is arranged coaxially within the outer shell such that an annular duct 23 is formed between the outer shell 21 and the inner shell 22, the duct 23 bypassing the engine core. Arranged radially within the annular duct 23 is a further annular duct 24 leading to the compressor 3 and including a section 26 in which the supercharger is arranged.

Arranged between the annular duct 23 and the annular duct 24 is an additional annular duct 27 bypassing the supercharger 2 and discharging into the annular duct 24 at a point downstream of the supercharger 2. The annular duct 27 is separated from the section 26 of the annular duct 24 by a housing accommodating an axially adjustable sliding cone 28 which forms part of a flow deflector means 25. The sliding cone 28 has a radial inner surface adapted to the contour of the opposite wall of the section 26 of the annular duct 24. The duct section 26 of the annular duct 24 leading through the supercharger 2 is optionally closed off by means of the sliding cone 28, actuated by a sliding mechanism suggested in the drawing only by rough outline. In the drawing, the sliding cone 28 is shown above the engine centerline in its open position, and below the engine centerline in its closed position. A further cone 29 forming part of the flow deflector means 25 is arranged downstream of the sliding cone 28 and serves to close off or open the annular duct 27, which bypasses the supercharger 2, where it discharges into the annular duct 24. As with the sliding cone 28, the radial inner surface of the sliding cone 29 is adapted to the contour of the opposite wall of the annular duct 24.

The sliding cone 29 is adjusted axially by means of a sliding mechanism again suggested in the drawing in rough outline only. In the drawing, the sliding cone 29 is shown above the engine centerline in a first position in which the sliding cone 29 seals off the annular duct 27 where it discharges into the annular duct 24, and below the engine centerline it is shown in a second position in which the annular duct 27 is open while the section 26 of the annular duct 24 is closed. Arranged in the annular duct 23 is a flap mechanism 30 serving to close or open the annular duct 23. Above the engine centerline the flap mechanism is shown in the closed position, and below the engine centerline it is shown in the open position. A variable exhaust nozzle 31 is arranged downstream of the power turbine 6.

The composite engine of the present invention operates as follows:

In the take-off and landing phases the brake 19 is operated to arrest the shaft 18 and, thus, the fan 1. The flap mechanism 30 in the annular duct 23 is in the closed position to prevent the intake of hot gas from the exhaust of the engine. The sliding cone 28 is in the open position in which the annular duct 27 is closed off and the section 26 of the annular duct 24 is open, so that the air from the fan 1 is led into the section 26 of the annular duct 24 and guided through the supercharger 2. After discharging from the supercharger 2 the supercharged air flows through the compressor 3, where the compressed air is ducted to the reverse-flow combustion chamber 4, in which the compressor air is enriched with fuel and the resulting mixture is ignited to exit from the combustion chamber 4 in the form of hot gas. The hot gas issuing from the reverse-flow combustion chamber 4 is first ducted through the gas generator turbine 5 and next through the power turbine 6. After leaving the power turbine 6, the hot gas escapes to the atmosphere through the variable exhaust nozzle 31. The gas generator turbine, energized with hot gas, drives the compressor 3 while the power turbine 6 drives the spur gearset 10, the output shaft 18 being arrested by means of the brake 19. The gearset 10 drives the output shaft 13 and, therefore, the supercharger 2 and, via the bevel gears 14 and 15, the output shaft 16 which drives the lift rotor.

In the transitional phase from rotor to fan operation, for cruise flight, the brake 19 is disengaged and the fan 1 attains service speed while the speed of the supercharger 2 and that of the output shaft 16 is correspondingly reduced until balance is achieved. The flap mechanism 30 in the annular duct 23 is simultaneously moved to its open position to permit escape of the fan jet to the rear. The sliding cone 28 and, if applicable, the sliding cone 29 are then positioned such that the volume of air flowing through the supercharger 2 is adapted to the decreasing speed of the supercharger 2. In cruise flight the output shaft 13 is now arrested by operating the brake 20, so that the supercharger 2 and the ring gear 12 of the gearset 10 are immobilized. Both sliding cones 28 and 29 are simultaneously adjusted to close off the duct section 26 and open the annular duct 27. The air diverted from the fan stream flows through the annular duct 27, ducting it directly to the compressor 3, while the fan stream escapes from the engine after flowing through the annular duct 23.

The embodiment of the present invention as described above may include the following modifications or alternatives. The single-state centrifugal compressor 3 may be replaced by a multiple-stage axial-flow compressor or by axial and centrifugal flow compressors in combination. In addition, use can alternatively be made of multiple-stage or centripetal-flow turbines. The gas generator comprising compressor and turbine may likewise be a multiple-shaft arrangement. A multiple-stage power turbine can be used in lieu of the single-stage power turbine. The fan 1 can be variable or arranged as a multiple-stage low-pressure compressor. The need for the annular duct 27 is obviated if entry and exit guide cascades are arranged at the supercharger, enabling the air diverted from the fan stream when the supercharger is immobilized to be ducted through the supercharger without incurring flow losses in the cascade of the supercharger.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A composite gas turbine engine for V/STOL aircraft, comprising:
    a fan,
    a lift device,
    a compressor,
    a turbine,
    two annular ducts arranged one within the other, the inner duct leading air from the fan to the compressor and turbine, and the outer duct leading air from the fan so that it bypasses the compressor and turbine,
    a supercharger between the fan and compressor, the supercharger being within the inner duct,
    a drive shaft rotated by the turbine, and
    means for alternatively coupling the drive shaft either to the fan or to the supercharger and lift device.

2. A composite gas turbine as defined in claim 1 wherein the supercharger is constructed to raise the pressure of air flow to the compressor to a greater degree than the fan.

3. A composite gas turbine as defined in claim 1 wherein said alternative coupling means includes a shaft connected to the fan, a shaft connected to the supercharger, and a gearset connecting the turbine drive shaft to both of the fan and supercharger drive shafts, and means for transmitting motion between the supercharger shaft and the lift device.

4. A composite gas turbine as defined in claim 3 wherein the gearset includes a planet gear carrier fixed to the fan shaft, a plurality of planet gears mounted on the carrier, a sun gear fixed to the fan drive shaft, and a ring gear fixed to the supercharger shaft.

5. A composite gas turbine as defined in claim 3 including a brake cooperating with each of the fan and supercharger shafts, each brake being capable of arresting rotation of its respective shaft.

6. A composite gas turbine as defined in claim 1 including a third duct leading from the fan to the inner duct while bypassing the supercharger, and flow deflector means for optionally guiding air from the fan into the third duct, to bypass the supercharger, when the fan is operating, or guiding air into the inner duct for passing through the supercharger when the fan is immobilized.

7. A composite gas turbine as defined in claim 6 including means for operating the flow deflector means to vary the volume of air flow through the supercharger in accordance with variations in speed of the supercharger.

8. A composite gas turbine as defined in claim 1 including a variable-vane inlet stator cascade in the inner duct upstream of the supercharger for adjusting the incidence of air flow through the inner duct in accordance with variations in speed of the supercharger.

9. A composite gas turbine as defined in claim 1 including variable-vane cascades in the inner duct upstream and downstream of the supercharger for adjusting the incidence and volume of air flow through the supercharger to the blade angle and speed of the supercharger.

10. A composite gas turbine as defined in claim 1 including means within the outer duct for preventing the intake of hot gas from the engine exhaust by the compressor or supercharger.

11. A composite gas turbine as defined in claim 1 including a variable exhaust nozzle downstream of the turbine.

* * * * *